(12) United States Patent
Geuens et al.

(10) Patent No.: US 12,001,200 B2
(45) Date of Patent: Jun. 4, 2024

(54) GAS NETWORK AND METHOD FOR DETECTING LEAKS IN A GAS NETWORK UNDER PRESSURE OR UNDER VACUUM

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 458 days.

(21) Appl. No.: 17/311,254

(22) PCT Filed: Nov. 26, 2019

(86) PCT No.: PCT/IB2019/060166
§ 371 (c)(1),
(2) Date: Jun. 4, 2021

(87) PCT Pub. No.: WO2020/115610
PCT Pub. Date: Jun. 11, 2020

(65) Prior Publication Data
US 2022/0026893 A1  Jan. 27, 2022

(30) Foreign Application Priority Data
Dec. 7, 2018  (BE) .................... 2018/5861

(51) Int. Cl.
*G05B 23/02*  (2006.01)
*F15B 19/00*  (2006.01)
(Continued)

(52) U.S. Cl.
CPC ........ *G05B 23/0243* (2013.01); *F15B 19/005* (2013.01); *F15B 20/005* (2013.01);
(Continued)

(58) Field of Classification Search
CPC ............ G01M 3/2815; G05B 13/0265; G05B 13/042; G05B 23/0243; G06Q 50/06;
(Continued)

(56) References Cited

U.S. PATENT DOCUMENTS

| | | |
|---|---|---|
| 795,134 A | 7/1905 | Jones |
| 4,796,466 A * | 1/1989 | Farmer ............... G01M 3/2807 73/49.1 |

(Continued)

FOREIGN PATENT DOCUMENTS

| | | |
|---|---|---|
| DE | 202008013127 U1 | 11/2009 |
| DE | 202010015450 U1 | 2/2011 |

(Continued)

OTHER PUBLICATIONS

International Search Report and Written Opinion from PCT Application No. PCT/IB2019/060166, Mar. 16, 2020.
(Continued)

*Primary Examiner* — Brandi N Hopkins
(74) *Attorney, Agent, or Firm* — Workman Nydegger

(57) ABSTRACT

A method is provided for detecting and quantifying leaks in a gas network under pressure or vacuum. The gas network includes one or more sources of compressed gas or vacuum; one or more consumers or consumer areas of compressed gas or vacuum applications; pipelines or a network of pipelines to transport the gas or vacuum; a plurality of sensors which determine one or a plurality of physical parameters of the gas in the gas network. The gas network has controllable or adjustable relief valves and the method involves a training phase and an operational phase.

22 Claims, 2 Drawing Sheets

(51) Int. Cl.
  *F15B 20/00* (2006.01)
  *F17D 5/00* (2006.01)
  *F17D 5/02* (2006.01)
  *G01M 3/28* (2006.01)
  *G05B 13/02* (2006.01)
  *G05B 13/04* (2006.01)
  *G06Q 50/06* (2024.01)
  *G06Q 10/20* (2023.01)

(52) U.S. Cl.
  CPC .............. *F17D 5/005* (2013.01); *F17D 5/02* (2013.01); *G01M 3/2815* (2013.01); *G05B 13/0265* (2013.01); *G05B 13/042* (2013.01); *G06Q 50/06* (2013.01); *F15B 2211/50518* (2013.01); *F15B 2211/634* (2013.01); *F15B 2211/857* (2013.01); *F15B 2211/8855* (2013.01); *G06Q 10/20* (2013.01)

(58) Field of Classification Search
  CPC ........... G06Q 10/20; F15B 2211/50518; F15B 2211/634; F15B 2211/857; F15B 2211/8855; F15B 19/005; F15B 20/005; F17D 5/005; F17D 5/02
  See application file for complete search history.

(56) References Cited

U.S. PATENT DOCUMENTS

| | | | |
|---|---|---|---|
| 5,272,646 A * | 12/1993 | Farmer | G01M 3/2807 73/40.5 R |
| 5,648,605 A | 7/1997 | Takahashi | |
| 6,389,881 B1 | 5/2002 | Yang et al. | |
| 6,711,507 B2 | 3/2004 | Koshinaka et al. | |
| 7,031,850 B2 | 4/2006 | Kambli et al. | |
| 7,049,975 B2 | 5/2006 | Vanderah et al. | |
| 2003/0187595 A1 | 10/2003 | Koshinaka et al. | |
| 2004/0149946 A1 | 8/2004 | Bender et al. | |
| 2005/0234660 A1 | 10/2005 | Kambli et al. | |
| 2005/0257595 A1 | 11/2005 | Lewis | |
| 2011/0060542 A1 | 3/2011 | Guasco et al. | |
| 2013/0066568 A1 * | 3/2013 | Alonso | G01M 3/243 702/51 |
| 2016/0356665 A1 | 12/2016 | Felemban et al. | |
| 2017/0003200 A1 | 1/2017 | McDowell et al. | |

FOREIGN PATENT DOCUMENTS

| | | |
|---|---|---|
| EP | 3115666 A1 | 1/2017 |
| GB | 2554950 A | 4/2018 |
| JP | 09027987 A | 1/1997 |
| JP | 2001214867 A | 8/2001 |
| JP | 2009003954 A | 1/2009 |
| WO | 2016161389 A1 | 10/2016 |
| WO | 2018106140 A1 | 6/2018 |

OTHER PUBLICATIONS

Belgian Search Report and Written Opinion for BE Application No. BE201805861, Jul. 4, 2019.

Abdulla et al., "Pipeline Leak Detection Using Artificial Neural Network: Experimental Study," 2013 5th International Conference on Modelling, Identification and Control (ICMIC), Aug. 31-Sep. 2, 2013, pp. 328-332.

Khazaali, Mohanad, "Optimization Procedure to Identify Blockages in Pipeline Networks via non-invasive Technique based on Genetic Algorithms", A Thesis Presented to the Graduate and Research Committee of Lehigh University, May 1, 2017, 175 pages.

Belgian Search Report from BE Application No. BE201805862, Jul. 4, 2019.

International Search Report and Written Opinion from PCT Application No. PCT/IB2019/060165, Feb. 20, 2020.

International Preliminary Report on Patentability from PCT Application No. PCT/IB2019/060165, Nov. 26, 2020.

Japanese Office Action from Japanese Patent Application No. JP2021-531771, Apr. 24, 2023.

* cited by examiner

GAS NETWORK AND METHOD FOR DETECTING LEAKS IN A GAS NETWORK UNDER PRESSURE OR UNDER VACUUM

BACKGROUND

The current invention relates to a method for detecting leaks in a gas network under pressure or under vacuum.

More specifically, the invention is intended to be able to detect and quantify leaks that occur in a gas network.

"Gas" herein means for example air, but not necessarily.

Methods for monitoring or controlling a gas network under pressure are already known, whereby these methods are set up for long and straight pipelines, where the incoming flow is not necessarily equal to the outgoing flow due to the compressibility of the gas in question.

These methods are based on a number of assumptions such as very long pipelines, straight pipelines, which are not suitable for complex gas networks under pressure where one or more compressor plants supply gas under pressure to a complex network of consumers.

Also, methods are already in place, as described in U.S. Pat. Nos. 7,031,850 B2 and 6,711,507 B2, to detect leaks in pneumatic components or tools of the final consumers themselves. A final consumer may be an individual final consumer or include a so-called consumer area or a group of individual final consumers.

Methods for estimating the total leakage rate on the source side are also known from e.g. DE 20.2008.013.127 U1 and DE 20.2010.015.450 U1.

In ABDULLA MOHAMMAD BURHAN ET AL: "Pipeline leak detection using artificial neural network: Experimental study" 2013 5TJ INTERNATIONAL CONFERENCE ON MODELLING IDENTIFICATION AND CONTROL (ICMIC), CAIRO UNIVERSITY, EGYPT, 31 Aug. 2013, pages 328-332, a detection method using a neural network is disclosed. In U.S. Pat. No. 6,389,881B1 an acoustic pipeline leak detection and location method is disclosed. In US 2005/234660A1 a method and apparatus for diagnosing leakage in a fluid power system is disclosed. In GB2554950A a method for estimating characteristics of new leaks in a pipe is disclosed. In WO2016/161389A1 an autonomous identification of an anomalous aqueous stream from an aqueous source feeding multiple independent streams and remediation directive determination thereof is disclosed.

The disadvantage of such known methods is that they do not allow for the detection of leaks in a complex network of pipelines between the source and the consumers or consumer areas. In addition, the distribution network of a gas or vacuum network is a source of leaks that should not be underestimated.

SUMMARY

The aim of the current invention is to provide a solution to this problem.

The current invention relates to a method for detecting and quantifying leaks in a pressurized or vacuum gas network; the gas network comprising:
one or more sources of compressed gas or vacuum;
  one or more consumers (7) or consumer areas of compressed gas or vacuum applications;
  pipelines or a network of pipelines to transport the gas or vacuum from the sources to the consumers, consumer areas or applications;
  a plurality of sensors which determine one or a plurality of physical parameters of the gas at different times and locations in the gas network;
characterized in that the gas network is further provided with a number of controllable or adjustable relief valves and that the method comprises the following steps:
  a training or estimation phase in which a mathematical model is established between the measurements of a first group of sensors and a second group of sensors, based on different measurements of these sensors, where one or a plurality of adjustable relief valves are controlled in a predetermined order and according to well-designed scenarios to generate leaks;
  an operational phase in which the mathematical model established between the measurements of the first group of sensors and the second group of sensors is used to predict and quantify obstructions in the gas network;
wherein the operational phase comprises the following steps:
  controlling the relief valves in a predetermined order and according to well-designed scenarios;
  reading out the first group of sensors;
  based on these readout measurements, calculating or determining the value of the second group of sensors using the mathematical model;
  comparing the calculated or certain values of the second group of sensors with the read values of the second group of sensors and determining the difference between them;
  determining whether there is a leak in the gas network on the basis of the aforementioned difference and any of its derivatives;
  generating an alarm if a leak is detected and/or generating a leakage rate and/or generating the corresponding leakage rate if a leak is detected.

'A predetermined order' in which the adjustable relief valves are controlled means the order in which the adjustable relief valves are opened and closed, in case there is more than one.

'Scenarios' refers to the different on and off states of the different relief valves, for example: [0 0 0 0], [1 0 0 0], [0 1 1 0], . . . in the case of four relief valves. It is possible that there are more states than just on (1) and off (0), where an intermediate state (e.g. ½) is equally important for leak detection and quantification.

The 'derivative of the difference' means any mathematical quantity that can be extracted from the difference, for example a sum, cumulative sum, arithmetic mean, smallest squares sum . . . .

The 'consumer area' refers to a group of individual (final) consumers. A gas network may contain several consumer groups or consumer areas.

An advantage is that such a method will make it possible to learn, detect and also quantify leaks in the gas network itself.

In other words, the leaks detected and quantified by the method are not limited to leaks in the sources or consumers of compressed gas, i.e. in the compressor plants and pneumatic tools or components, but may also concern leaks in the distribution pipelines of the gas network itself.

It should be noted that in the case of a gas network under pressure, leaks will occur to the outside and gas will escape to the surrounding area. In a vacuum gas network, leaks will occur 'inwards', i.e. ambient air will enter the gas network.

During the training phase, using the measurements of the various sensors, a relationship is established between this group of sensors.

Different measurements are made at different settings of the relief valves. In other words, different leaks are generated in the gas network in a specific designed sequence under different test scenarios and then the measurements of the sensors are read out.

On the basis of all the data, a mathematical model is established between the first group of sensors, or the input of the mathematical model, and the second group of sensors, or the output of the mathematical model. The input or mathematical manipulations are also called 'features' of the mathematical model and the output is also called 'targets'.

In this way, a mathematical model will be created that shows the relationship between the different parameters measured by the sensors.

This model will then be used to immediately detect irregularities in future measurements of the sensors by comparing the results of the model and the measurements of the sensors.

In this way, leaks will be detected, located and quantified very quickly and accurately and, in case of detection of a leak, action can be taken and the leak can be repaired.

An additional advantage of a method in accordance with the invention is that the exact topology of the gas network does not have to be known. Knowing the location of the relief valves is basically sufficient to be able to detect, quantify and locate the leaks.

Another advantage is that the method according to the invention takes into account the entire gas network and can therefore detect, quantify and locate leaks in the entire gas network. This means that the network should not be divided into 'sub-networks' to which the method is applied in order to be able to apply the method.

Another advantage is that the method makes it possible to use measurements or datasets from the sensors in the training phase to create the mathematical model, where leaks are simulated, instead of having to use data from the sensors, where 'real' leaks occurred in the gas network. The generation of the necessary data from the sensors is therefore necessary in order to be able to draw up the mathematical model, not dependent on any leaks that may have occurred in the past.

Preferably, the operational phase should be temporarily interrupted or stopped at certain times, after which the training phase should be resumed in order to redefine the mathematical model or the relationship between the measurements of different sensors, before the operational phase is resumed.

It should be noted that the process, i.e. the gas network with sources, pipelines and consumers, is not shut down, but only the method. In other words, if the operational phase is temporarily interrupted or stopped, the sources will still supply gas or vacuum to the consumers.

Interrupting the operational phase and resuming the training phase has the advantage that the mathematical model or relationship is updated.

This will make it possible to take into account, for example, detected leaks that are being repaired or adjustments or expansions to the gas network that are being made over time.

The invention also concerns a gas network under pressure or under vacuum; the gas network is at least provided with:
  one or more sources of compressed gas or vacuum;
  one or more consumers, consumer areas of compressed gas or vacuum applications;
  pipelines or a network of pipelines to transport the gas or vacuum from the sources to the consumers, consumer areas or applications;
  a plurality of sensors which determine one or more physical parameters of the compressed gas at different locations in the gas network;
with the characteristic that the gas network is further provided with:
  a number of controllable or adjustable relief valves;
  possibly one or a plurality of sensors which can register the state or status of one or more relief valves;
  a data acquisition control unit for the collection of data from the sensors and for controlling or adjusting the aforementioned relief valves;
  a computing unit for carrying out the method in accordance with the invention.

Such an arrangement can be used to apply a method in accordance with the invention.

BRIEF DESCRIPTION OF THE DRAWINGS

To better demonstrate the characteristics of the invention, a number of preferred variants of a method and gas network in accordance with the invention have been described below, by way of example without any restrictive character, with reference to the accompanying drawings, in which.

DETAILED DESCRIPTION OF VARIOUS EMBODIMENTS

Figure 1:
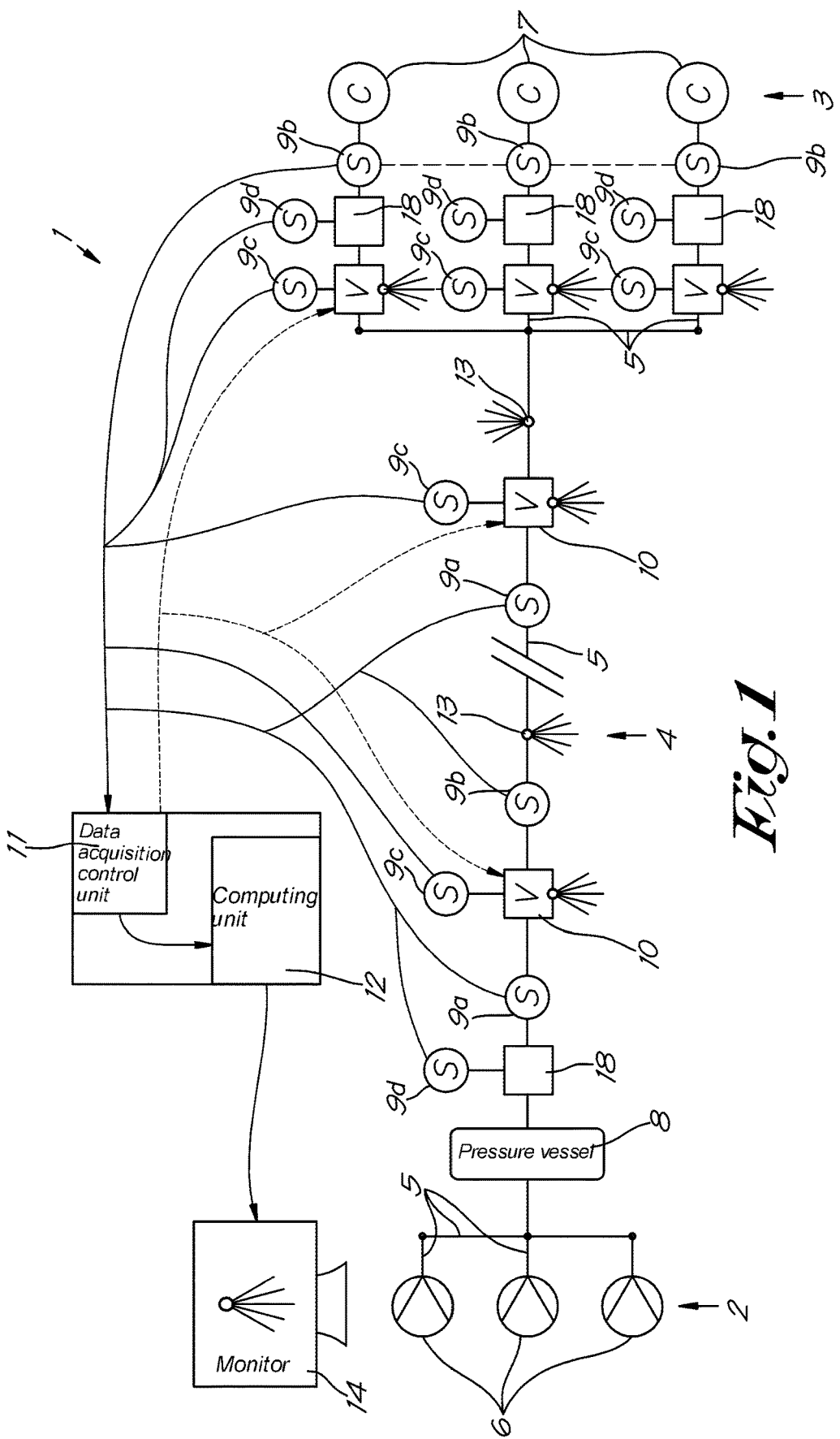
FIG. 1 schematically shows a gas network according to the invention.

The gas network 1 in FIG. 1 comprises mainly a source side 2, a consumer side 3 and a network 4 of pipelines 5 between the two.

The gas network 1 in this case is a gas network 1 under pressure. The gas can be air, oxygen or nitrogen or any other non-toxic and/or hazardous gas or mixture of gases.

The source side 2 comprises a number of compressors 6, in this case three, which generate compressed air. The consumer side 3 comprises a number of consumers 7 of compressed air and in this case also three.

It is also possible that the compressors 6 contain compressed air dryers.

It is not excluded that there may also be compressors 6 downstream of the gas network 1. This is referred to as "boost compressors".

The compressed air is routed through the network 4 of pipelines 5 from the compressors 6 to the consumers 7. This network 4 is in most cases a very complex network of pipelines 5.

FIG. 1 shows this network 4 in a very schematic and simplified way. In most real situations, the network 4 of pipelines 5 comprises a large number of pipelines 5 and couplings that connect the consumers 7 in series and in parallel with the compressors 6. It is not excluded that part of the network 4 adopts or comprises a ring structure.

This is because the gas network 1 is often extended over time with additional consumers 7 or compressors 6, whereby new pipelines 5 between the existing pipelines 5 have to be laid, which leads to a tangle of pipelines 5.

The gas network 1 may also be provided with a pressure vessel 8, with all compressors 6 in front of this pressure vessel 8.

It is not excluded that there may be one or more pressure vessels 8 downstream of the gas network 1.

In addition, components 18, such as filters, separators, atomizers and/or regulators, can also be provided in the gas network 1. These components 18 can be found in various combinations and can be found both near the buffer tank 8 and close to the individual consumers 7.

Network 4 also includes a number of sensors 9a, 9b, 9c, which are located at different locations in network 4.

In this case, two flow sensors 9a have been installed, one of which is just after the aforementioned pressure vessel 8, which will measure the total flow q provided by all compressors 6.

It is not excluded that the flow rates of the compressors 6 are calculated or measured by themselves.

In addition, the figure shows four pressure sensors 9b, which measure the pressure at different locations in the network 4.

In this case, the pressure 9b in the pressure vessel is preferably also measured to correct the "mass in-mass out" principle for large, concentrated volumes.

It is clear that more or less than four pressure sensors 9b can also be provided. In addition, the number of flow sensors 9a is not limiting for the invention.

In addition to flow sensors 9a or pressure sensors 9b, additionally, or alternatively, sensors 9a, 9b may be used to determine one or more of the following physical parameters of the gas: differential pressure, temperature, humidity, gas velocity and the like.

In accordance with the invention, the gas network 1 is also provided with a number of relief valves 10 which are installed in the pipelines 1 at various locations. The relief valves 10 are adjustable or controllable, which means that the amount of gas they vent can be adjusted or regulated.

In addition to the aforementioned sensors 9a and 9b, which can measure the physical parameters of the gas, there are also a number of sensors 9c, or 'state sensors 9c', which are located at the relief valves 10. Preferably the sensors 9c are part of the relief valve 10.

Although not explicitly indicated in FIG. 1, it cannot be excluded that in the gas network 1 there are additional state sensors 9c in the vicinity of the compressors 6 and the consumers 7 that determine the on/off state of these components. Preferably, these state sensors are part of the consumers 7 themselves.

The additional state sensors 9c (e.g. on/off of the compressors 6) then aim to significantly reduce the cross-sensitivity of the model during the training phase 16 and the operational phase 17, as will be explained below.

It is also possible to use sensors 9a, 9b which measure the pressure or flow of the gas at the relief valves 10. It is also possible to use sensors which measure the temperature of the gas at the relief valves 10.

The relief valves 10 can be formed by drainage valves, which are often provided as standard in a gas network 1. Such drainage valves can be controlled as a relief valve 10.

At least some of the flow sensors, pressure sensors, alternative sensors and/or state sensors 9a, 9b, 9c should preferably be located in the vicinity of the relief valves 10. In this case, each flow sensor 9a and each status sensor 9c are placed in the vicinity of a relief valve 10.

In this case, the flow sensor 9a will be used to measure the flow rate of the respective relief valve 10, which will allow quantification of the leakage flow, and the state, i.e. open or closed, of the relief valve 10 can be determined using the state sensor 9c.

Preferably, a sensor 9a, 9b, 9c and/or vice versa should be provided in the vicinity of each relief valve 10 in the gas network 1, i.e. a relief valve 10 should be provided near each sensor 9a, 9b.

It is also possible that at least part of the sensors 9a, 9b, 9c are integrated in one module together with a relief valve 10.

This will also simplify and speed up the installation or integration of the sensors 9a, 9b, 9c and the relief valves 10. In addition, it can be ensured that a correct and suitable sensor 9a, 9b, 9c for the relief valves 10 is placed together in one module.

The aforementioned differential pressure sensors 9d are preferably placed over filter, separator, atomizer and/or regulator components 18. In the current example, four differential pressure sensors 9d have been incorporated into the gas network 1.

The aforementioned humidity and temperature sensors should preferably be mounted on the inlet/outlet of compressor plants 6 and the consumers 7. In the example shown, these additional sensors are not all included in the gas network 1, but it goes without saying that this is also possible. Especially in more extensive and complex gas networks 1 such sensors 9a, 9b can be used, as well as in networks where only the volumetric flow rate is measured instead of the mass flow rate.

In accordance with the invention, the gas network 1 is further provided with a data acquisition control unit 11 to collect data from the aforementioned sensors 9a, 9b, 9c, 9d and also to control the relief valves 10.

In other words, sensors 9a, 9b, 9c, 9d determine or measure the physical parameters of the gas and the relief valves 10 and send this data to the data acquisition control unit 11, and the data acquisition control unit 11 will control or check how much the relief valves 10 are opened to vent the gas.

In accordance with the invention, the gas network 1 is further provided with a computing unit 12 for processing the data from sensors 9a, 9b, 9c, 9d, wherein the computing unit 12 will be able to carry out the method for detecting and quantifying leaks 13 in the gas network 1 in accordance with the invention, as explained below.

The aforementioned computing unit 12 can be a physical module which is a physical part of the gas network 1. It cannot be excluded that the computing unit 12 is not a physical module, but a so-called cloud-based computing unit 12, which may or may not be connected wirelessly to the gas network 1. This means that the computing unit 12 or the software of computing unit 12 is located in the 'cloud'.

In this case, the gas network 1 is further provided with monitor 14 to display or signal leaks 13 that were detected using the method.

The operation of gas network 1 and the method in accordance with the invention is very simple and as follows.

Figure 2:
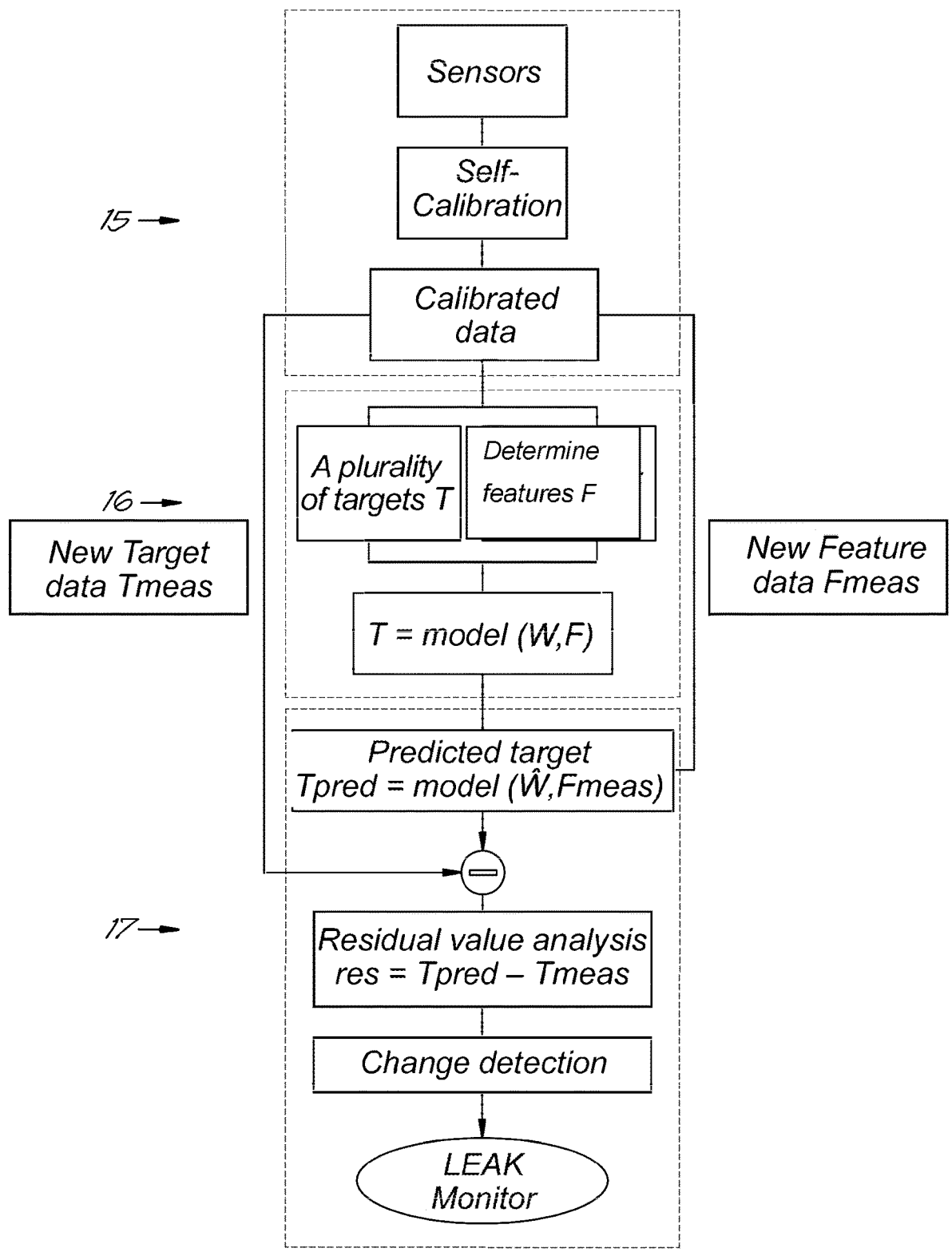
FIG. 2 shows a schematic flowchart of the method in accordance with the invention.

FIG. 2 schematically illustrates the method for detecting leaks 13 in the gas network 1 of FIG. 1.

In the first phase 15, start-up phase 15, sensors 9a, 9b, 9c, 9d are calibrated before use if necessary. It goes without saying that if there are other sensors, they can also be calibrated before use.

This happens once when the sensors 9a, 9b, 9c, 9d are placed in the gas network 1. Of course, it is possible that sensors 9a, 9b, 9c, 9d may be recalibrated over time.

Preferably, at least the group of sensors 9a should be calibrated during operation or by means of an in-situ self-calibration. This means that these sensors 9a in the gas network 1, i.e. after they have been installed, are calibrated.

"In operation" or "in situ" means calibration without removing the sensor 9a from the gas network 1.

It is of course possible that all sensors 9a, 9b, 9c, 9d and thus also the first group of sensors 9a, 9b, 9c or 9d will be calibrated in operation or in situ by means of a self-calibration.

In this way one can be sure that the placement and/or possible contamination of the sensors 9a, 9b, 9c, 9d will not affect their measurements, because only after the placement of the sensors 9a, 9b, 9c, 9d will you perform the calibration or repeat the calibration for a certain period of time.

Then the second phase 16 or the training phase 16 starts.

In this phase, a mathematical model is made between the measurements of a first group of sensors 9a, 9b, 9c, 9d or the 'features' and a second group of sensors 9a, 9b, 9c, 9d or the 'targets'.

Preferably, the first group of sensors 9a, 9b, 9c, 9d includes several pressure sensors 9b at different locations in the gas network, a number of flow sensors 9a and possibly one or more state sensors 9c, and the second group of sensors 9a, 9b, 9c, 9d includes several flow sensors 9a at different locations in the gas network.

In this case, part of the flow sensors 9a, the pressure sensors 9b and the status sensors 9c form the first group of sensors, and the remaining flow sensors 9a form the second group of sensors.

For the sake of completeness, it is stated here that the invention is not limited to this. For the first and second group of sensors, any selection can be made from the sensors (9a, 9b, 9c, 9d), with the only restriction that a sensor in the first group should not be in the second group and vice versa.

The aforementioned mathematical model is based on various measurements of sensors 9a, 9b, 9c, 9d where the adjustable relief valves 10 are controlled to generate leaks.

In other words, the data acquisition control unit 11 collects data or measurements from sensors 9a, 9b, 9c, 9d where the data acquisition control unit 11 will control the relief valves 10 in order to be able to open them so that leaks are created in the gas network 1, so that data can be collected from sensors 9a, 9b, 9c, 9d in case of a leak or leaks 13 in the gas network 1.

In this way, a whole set of data or measurements can be collected, together with the information from the relief valves 10, i.e. the location and size of the introduced leaks. The computing unit 12 will make a mathematical model on the basis of all this information. This mathematical model is preferably a black-box model or a data-driven model. The model typically contains a number of parameters or coefficients, also called 'weights', which are estimated.

This black-box model, for example, takes the form of a matrix or a non-linear mathematical vector function or the like.

The mathematical model is based on a number of assumptions. In this case, it is assumed that the resistance of the pipelines 5 of the gas network 1 does not change and that the topology of the gas network 1 is fixed.

The training phase 16 should preferably be carried out during the operation of the gas network 1 or when the gas network 1 is operational.

The mathematical model is used in an operational phase 17 to detect and quantify leaks 13 in the gas network 1. Although not common, it cannot be excluded that during the operational phase the relief valves 10 are controlled in a predetermined order and scenario to locate leaks 13. It should be noted that control in accordance with scenario [0 0 0 . . . ] is also possible.

Also during this phase, the data acquisition control unit 11 will collect different data from the sensors 9a, 9b, 9c, 9d and the computing unit 12 will perform the necessary calculations using the mathematical model that was set up in the previous phase 16.

The operational phase 17 starts with the reading of the first group of sensors 9a, 9b, 9c, 9d.

With these read measurements, the value of the second group of sensors 9a is determined or calculated by the computing unit 12 using the mathematical model, also called 'predicted target'.

The determined or calculated value of the second group of sensors 9a is compared with the read values of the second group of sensors 9a and the difference between them is determined.

On the basis of the aforementioned difference, the computing unit 12 determines whether there is a leak 13 and, if necessary, locates the leak in the gas network 1.

For this purpose, it will be examined whether the difference exceeds a certain threshold, which will then indicate a leak 13 in the gas network 1.

This threshold value can be set in advance or selected empirically.

When a leak 13 is detected, an alarm will be generated with possibly the corresponding leakage rate and/or the leakage cost. In this case, this is done using monitor 14, which displays the alarm.

The user of the gas network 1 will notice this alarm and be able to take the appropriate steps.

The steps of the operational phase 17 are preferably repeated sequentially, cyclically, at a certain time interval.

As a result, during the entire operational period of the gas network 1, leaks 13 can be detected, and not just once during or shortly after the start up of the gas network 1.

The aforementioned time interval can be selected and set depending on the gas network 1. It cannot be excluded that the time interval may vary over time.

In a preferred variant of the invention, at certain moments, the operational phase 17 will be temporarily interrupted or stopped, after which the training phase 16 will be resumed in order to re-establish the mathematical relationship between the measurements of different sensors 9a, 9b, 9c, 9d, before the operational phase 17 is resumed.

'At certain moments' should herein be interpreted as moments that are preset, for example once a week, per month or per year, or as moments that can be chosen by the user.

This will update the mathematical model to take into account the possible time-varying behavior of the system. These time-varying behaviors are behaviors that were not captured by the mathematical model during the training phase 16 when the mathematical model was trained under different scenarios.

This could include, for example, changes in the topology of gas network 1 or the addition of new components to gas network 1.

Preferably, the sensors 9a, 9b, 9c, 9d are calibrated by means of an in-situ self-calibration. This means that sensors 9a, 9b, 9c, 9d in the gas network 1, i.e. after they have been installed, are calibrated.

In this way, you can be sure that the placement of the sensors 9a, 9b, 9c, 9d will not affect their measurements, because the calibration will only be done after the placement of the sensors 9a, 9b, 9c, 9d.

Although in the example of FIG. 1 it concerns a gas network 1 under pressure, it can also be a gas network 1 under vacuum.

Source side 2 then comprises a number of sources of vacuum, i.e. vacuum pumps or similar.

In this case, the consumers 7 have been replaced by applications that require vacuum.

Furthermore, the method is the same, taking into account of course that leaks now introduce ambient air into the gas network 1. Preferably, smaller thresholds will be set to generate an alarm.

Also, in this case the relief valves 10 will introduce ambient air into the gas network 1, rather than blowing off real air. The relief valves 10 are therefore more likely to be suction valves 10. However, the principle remains the same.

This invention is by no means limited to the embodiments by way of example and shown in the figures, but such a method and gas network as claimed in the invention can be carried out in different variants without going beyond the scope of the invention.

The invention claimed is:

1. A method for detecting and quantifying leaks in a gas network under pressure or vacuum, the gas network including: one or more sources of compressed gas or vacuum; one or more consumers or consumer areas of compressed gas or vacuum applications; pipelines or a network of pipelines to transport the gas or vacuum from the sources to the consumers, consumer areas or applications; and a plurality of sensors which determine one or a plurality of physical parameters of the gas at different times and locations in the gas network; wherein the gas network is further provided with a number of controllable or adjustable relief valves, the method comprising the following steps:
   during a training phase, establishing a mathematical model between measurements of a first group of sensors and a second group of sensors comprising a plurality of pressure sensors, a number of flow sensors and a number of state sensors at different locations in the gas network, based on different measurements of these sensors, the second group of sensors comprising a plurality of state sensors at different locations in the gas network,
   controlling the adjustable relief valves in a predetermined order and according to predetermined scenarios to generate leaks, wherein a sensor from the first group is not in the second group and vice versa;
   during an operational phase, establishing the mathematical model between the measurements of the first group of sensors and the second group of sensors is used to detect, locate and quantify leaks in the gas network;
   wherein the operational phase comprises the following steps:
   controlling the relief valves in a predetermined order and according to predetermined scenarios;
   reading out the first group of sensors;
   based on these readout measurements, calculating or determining a value of the second group of sensors with the mathematical model;
   comparing the calculated or determined values of the second group of sensors with the read values of the second group of sensors and determining the difference between them;
   determining whether there is a leak in the gas network based on the difference and any derivative of the difference comprising a mathematical quantity extractable from the difference;
   generating an alarm if a leak is detected and/or; generating a leakage rate and/or generating a corresponding leakage cost as well as any location if a leak is detected wherein the location is determined by controlling the adjustable relief valves in a predetermined order.

2. The method according to claim 1, wherein at least a part of the flow sensors are placed in the vicinity of the relief valves so that the flow rate of the relief valves can be measured.

3. The method according to claim 1, wherein during the training phase, the sensors are calibrated in a start-up phase before use.

4. The method according to claim 3, wherein the sensors are calibrated by means of an in-situ self-calibration.

5. The method according to claim 1, wherein the sensors can measure one or more of the following physical parameters of the gas:
   pressure, differential pressure, temperature, flow, gas velocity and humidity.

6. The method according to claim 1, wherein the operational phase is temporarily interrupted or stopped at certain moments, after which the training phase is resumed in order to redefine the mathematical model between the measurements of the first group of sensors and the second group of sensors before the operational phase is restarted.

7. The method according to claim 1, wherein the operational phase steps are sequentially repeated at a given time interval.

8. The method according to claim 1, wherein the relief valves are formed by drainage valves.

9. The method according to claim 1, wherein at least part of the sensors, together with a relief valve, are integrated in one module.

10. The method according to claim 1, wherein in the vicinity of each relief valve in the gas network, a sensor is provided and/or vice versa.

11. The method according to claim 1, wherein it is gas, air, oxygen or nitrogen or another non-toxic and/or dangerous gas or mixture of gases.

12. The method according to claim 1, wherein the mathematical model is a black-box model.

13. The method according to claim 1, wherein the mathematical model defines a matrix and/or a nonlinear vector function with parameters or constants, where changes of output or 'targets' of the mathematical model are tracked during the operational phase.

14. The method according to claim 1, wherein the gas network is further provided with one or a plurality of sensors which can register the state of one or a plurality of relief valves and/or that the gas network is further provided with one or a plurality of differential pressure sensors.

15. A gas network under pressure or under vacuum, the gas network is at least provided with:
   one or more sources of compressed gas or vacuum;
   one or more consumers or consumer areas of compressed gas or vacuum applications;
   pipelines or a network of pipelines to transport the gas or vacuum from the sources to the consumers or consumer areas;
   a plurality of sensors providing one or more physical parameters of the compressed gas at different times and locations within the gas network;
   wherein the gas network is further provided with:
   a number of controllable or adjustable relief valves;
   one or a plurality of sensors which can register the state or status of one or a plurality of relief valves;
   a data acquisition control unit for the collection of data from the sensors and for controlling or adjusting the relief valves;

a computing unit for carrying out the method according to claim 1.

16. The gas network according to claim 15, wherein at least some of the sensors, together with a relief valve, are integrated in one module.

17. The gas network according to claim 15, wherein in the vicinity of each relief valve in the gas network a sensor is provided and/or vice versa.

18. The gas network according to claim 15, wherein the relief valves are formed by drainage valves.

19. The gas network according to claim 15, wherein at least part of the sensors together with a relief valve are integrated in one module.

20. The gas network according to claim 15, wherein the gas network is further provided with a monitor to display or signal leaks, leakage rates, leakage costs and location.

21. The gas network according to claim 15, wherein the gas network is further provided with one or a plurality of sensors which can register the state or status of one or a plurality of relief valves and/or that the gas network is further provided with one or a plurality of differential pressure sensors.

22. The gas network according to claim 15, wherein the computing unit is a cloud-based computing unit connected to the gas network.

\* \* \* \* \*